INVENTORS.
KEITH W. CAMPBELL
DONALD H. IMHOFF
ROBERT T. PENNINGTON
JOHN M. ROBERTS

ATTORNEY.

March 29, 1966  K. W. CAMPBELL ETAL  3,243,351
STEAM PRODUCING REACTOR AND FUEL THEREFOR
Original Filed Oct. 11, 1962  3 Sheets-Sheet 2

INVENTORS.
KEITH W. CAMPBELL
DONALD H. IMHOFF
ROBERT T. PENNINGTON
JOHN M. ROBERTS

BY
ATTORNEY.

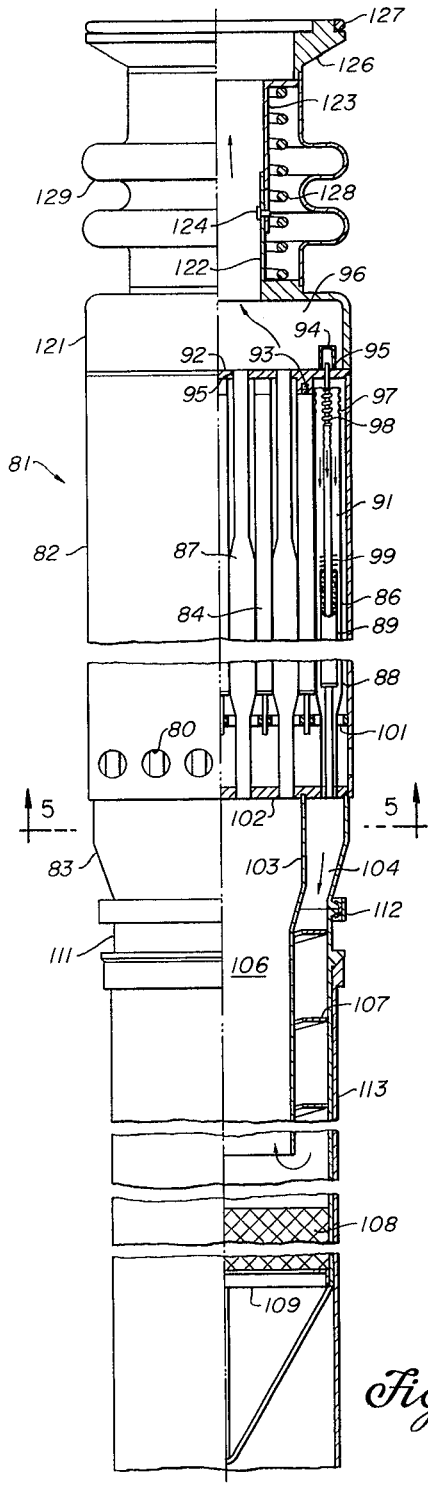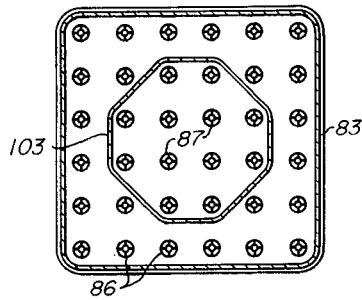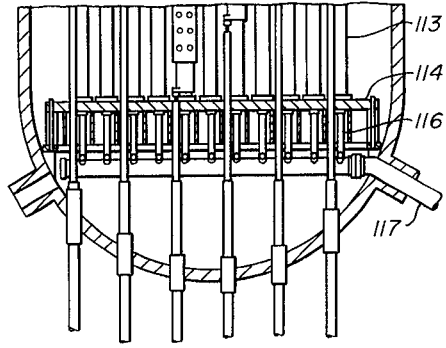
Fig. 4.
Fig. 5.
Fig. 6.
INVENTORS.
KEITH W. CAMPBELL
DONALD H. IMHOFF
ROBERT T. PENNINGTON
JOHN M. ROBERTS
ATTORNEY.

United States Patent Office 3,243,351
Patented Mar. 29, 1966

3,243,351
STEAM PRODUCING REACTOR AND FUEL
THEREFOR
Keith W. Campbell, Robert T. Pennington, Donald H. Imhoff, and John M. Roberts, all of San Jose, Calif., assignors to the United States of America as represented by the United States Atomic Energy Commission
Original application Oct. 11, 1962, Ser. No. 230,019. Divided and this application Dec. 23, 1964, Ser. No. 424,879
5 Claims. (Cl. 176—78)

This invention relates to neutronic reactors which produce steam, particularly superheated steam, within a reactor core containment vessel. More specifically, this invention relates to superheat neutronic reactors and fuel bundles therefore in which steam of varying predetermined quality is produced from water in a plurality of passes through fuel elements. In a preferred embodiment of the invention, superheated steam is produced.

This application is a division of our copending application S.N. 230,019, filed October 11, 1962, and now abandoned.

This invention provides fuel bundles for a neutronic superheat reactor in which all of the heating and steam processing functions are performed therein. This is accomplished by boiler rods interspersed among process tubes having sized openings and the like for pressure control. In one embodiment the process tubes are zoned into a central superheat area for a final pass and an outer transition zone for intermediate heating. The bundles are provided with means for an adjustable, removable pressure fit against upper and lower supporting structure, including in the preferred embodiment a compression spring in combination with adjustable fittings as disclosed. Additional novelty resides in a central baffle underlying the process tube grids, steam separator means, demister and centrifuge means, and purification means. A manifold pressure equilizer is further provided which may be used in combination with a plurality of bundles.

A direct-cycle, boiling water nuclear reactor is one in which fissioning of the nuclear fuel produces heat which boils water contained within the core of the reactor. The steam formed thereby may be conveyed to a turbo-generator to generate electricity. U.S. Patent No. 2,936,273, issued May 10, 1960, filed June 28, 1955, on behalf of Samuel Untermeyer describes a direct-cycle boiling water reactor which may be modified in accordance with the teachings of this invention to generate superheated steam within the reactor core.

The use of saturated steam to drive a turbine is less efficient than use of superheated steam in modern conventional central station power plants, superheated steam is invariably employed since the thermal efficiency of the turbine increases with an increase in steam temperature. The combination of a nuclear reactor, a steam producing boiler, and a superheater into one assembly has been a primary objective of power reactor designers. However, heretofore, a satisfactory means of producing steam and superheating it within each of a plurality of symmetrical fuel bundles to the temperatures desired for modern power plants has not been available.

Early proposals for superheating steam within a nuclear reactor core made by Herbert E. Metcalf, U.S. patent application S.N. 649,408, filed February 21, 1946, now Patent No. 2,787,593 issued April 2, 1957, and Eugene P. Wigner, U.S. patent application S.N. 769,301, filed August 18, 1947, now Patent No. 2,806,820 issued September 17, 1957. In their reactor systems, however, water was heated within the reactor core and flashed into steam outside of the reactor vessel. The steam was then directed back into the reactor core where it was superheated. The systems described were not efficient steam producers since steam was not initially produced within the core.

Subsequent to the invention of the boiling water reactor by Samuel Untermeyer described in his patent application hereinbefore referenced it was proposed to boil water and superheat steam within the same reactor core as evidenced by the application of Michael Treshow, S.N. 655,155, filed April 25, 1957, now Patent No. 2,938,845 issued May 31, 1960. In the Treshow system, water was boiled in the reactor tank exterior to the fuel elements. The resulting steam was piped out of the reactor tank and then reintroduced into the reactor core to channels within the fuel elements where the steam was superheated. Considerable piping and equipment were required to recirculate the saturated steam into the interior of the fuel elements of the active core.

Other proposals have been made for producing and superheating steam within the same reactor core whereby the steam would be produced in a particular portion of the core such as in a peripheral zone at the exterior of the core and then superheated in a central zone. In these systems, it has been the usual practice to produce steam as the coolant flows through a steam producing zone of the core in the opposite direction. Proper ducting is required between the steam producing zone and the steam superheating zone to provide for the necessary steam flow.

An embodiment for producing superheated steam by production of saturated steam in the periphery of a reactor core and recirculation into the central active portion, disclosed and claimed in an application of Joseph H. Harrer et al. for U.S. Letters Patent, S.N. 27,462(60) entitled Nuclear Reactor Fuel Assembly, now Patent No. 3,049,487 issued August 14, 1962, is also acknowledged. In this embodiment the outer core region consists of fissile fueled tubes which contact water to produce saturated steam. The saturated steam flows to a chamber at one end of the core and then is directed back in an in-and-out pass through concentric fuel tubes sealed at one end in the central core portion, whereby superheated steam for a turbine loop is produced.

While the prior art as represented by the foregoing embodiments produces saturated and/or superheated steam within the critical core region of a neutronic reactor or by contact with heated coolant therefrom, several inherent problems in the prior art designs are apparent which preclude formation and superheating of steam in a single fuel element assembly of a conventional reactor, particularly liquid cooled, liquid moderated reactors employing fuel elements comprising concentric cylinders of fissile materials. Specifically, the prior art embodiments produce steam in outlying or separated areas in the reactor and superheat the steam in a second pass through different portions of the reactor, thereby requiring special construction and the solution of different engineering problems in different portions of the reactor. Further, prior art attempts to produce superheated steam in an element submerged in liquid coolants or moderators have not been practical because the permissible temperature differential was limited. The usual temperature of operation in the prior art embodiments for producing superheated steam is only of the order of 600° F. or below, maximum. The upper temperature limitation is ordinarily determined by the materials of construction which have the requisite cross section for thermal neutrons, structural strength of the desired temperatures, and proper sizing commensurate with costs of construction and design factors. Temperatures as high as 1000° F. are thereby generally precluded and uniform temperature gradients have not been stressed.

A reactor embodiment in which steam is both produced and superheated within each of a plurality of fuel elements with a reactor core grid is disclosed and claimed in copending U.S. application S.N. 168,857, and now U.S. Patent No. 3,121,666, entitled Superheated Steam Producing Nuclear Reactor, by Clifford W. Wheelock, filed January 25, 1962, now Patent No. 3,121,666 issued February 18, 1964. The Wheelock design provides for in-and-out passes within the single fuel elements incorporating, among other features, dead steam spaces adjacent the superheat cylinders to insulate from loss of heat to the water boiling passes.

The present invention provides a similar function within shrouded, compact, unitized fuel bundles, with resulting advantages in fabrication and reactor control, and also incorporates additional individual novel features as well as a new basic fuel bundle design. Boiler rods are provided for producing steam during an initial pass, with water and steam plenums at the respective bundle ends. Process tubes, either in zones divided according to heating capacity, or interspersed uniformly throughout the bundle, provide superheating capacity. Various provisions for demisting, purification of water, etc., are incorporated into the embodiment. The resulting bundle is a self-contained unit for producing and superheating steam and carrying out the several other steam processing operations ordinarily accomplished only within the reactor as a whole. Bundles are conveniently supported by cylinders having adjustable spring compression means at one end of each bundle in combination with variable length support means. Precise temperature control of the superheat pass is assured by means of controlled process tube inlet means such as sized inlet openings and steam guide means such as swirl vanes. Invention resides in the precise structural combination and relationships of the several functional components, together with modifications new in the reactor arts.

Unlike many prior embodiments of the art, mechanical steam separators and reactor recirculating piping and pumps are eliminated in the preferred embodiment. Significantly, the structural arrangements and combinations enable operation of the fuel at high heat flux in the region of the high steam quality because a minimum heat transfer coefficient is possible with steam of high quality. This minimum heat transfer coefficient permits operation at a heat flux above the normal burnout heat flux for low quality steam since it is possible to predict the maximum fuel cladding temperatures. This results in establishing a performance limit in the transition boiling region which is based on maximum fuel surface temperature, rather than heat flux, in a manner similar to the design procedure used for establishing performance limits of the fuel in the superheat region.

Accordingly, an object of the invention is to provide a fuel bundle capable of producing and superheating steam therein. Another object of the invention is to provide a fuel bundle which is unitized, easily removable from a reactor core, compact, and in which is self contained all of the individual steam producing functions desired within the reactor core as a whole including boiling water, separation of moisture from steam, condensation of wet steam, removal of entrained water to a point where purification can be undertaken, and centrifugation of wet steam. A further object of the invention is to provide a fuel bundle having both boiler rods for boiling water and process tubes for superheating steam mounted between water and wet steam plenums adapted to provide controlled superheating within the individual fuel bundles. A still further object of the invention is to provide means for steam pressure control and distribution both within the individual fuel bundles and also in a manifolding system for use in combination with a plurality of bundles.

A further object of the invention is to provide such a fuel bundle enclosed in a shroud between upper and lower plenum. Another object is to provide such a fuel bundle which is adapted to be supported in compressive fit at the upper plenum exit, e.g., by spring loaded supports held against the pressure vessel support or plenum structure. A still further object is to provide boiler rods and/or transition process tubes mounted to produce wet steam for collection in a wet steam plenum and superheat process tubes leading from the wet steam plenum to the superheat steam plenum. Another object is to provide swirl vanes and the like within the process tubes for controlled heating, pressure and distribution of the wet steam. Another object is to provide a central axial boiler rod and process tube zone for superheating steam. A further object is to provide a wet steam separator, demister, centrifuge unit and demineralizer outlet adjacent to or integral with a lower wet steam plenum.

The invention will be better understood upon examination of the following description and figures, of which:

FIGURE 4 is a cross sectional side view of another preferred embodiment of the invention incorporating wet steam separation structure;

FIGURE 5 is a cross sectional end view of the fuel bundle of FIGURE 4 taken along line 5—5 of FIGURE 4; and FIGURE 6 is a cross sectional side view of a neutronic reactor showing the supporting and lower plenum structure in combination with the fuel bundle of FIGURE 4.

The once-through superheat reactor of the present invention is a thermal spectrum, water moderated boiling water, superheated steam cooled reactor where the boiling and super-heating is done in a continuous flow process within a single reactor vessel. Departure from nucleate boiling must be accepted and controlled in a once-through reactor if high heat fluxes and peak performance are desired. This represents a departure from boiling water reactor design practice where heat flux is limited by a burnout limit. For the once-through superheater, the fuel is protected from burnout at low steam qualities, by a factor of safety in the normal manner, but at high steam qualities in the transition region departure from nucleate boiling is permitted. In practice it has been found that the temperature rise at the point of departure from nucleate boiling is small and reproducible.

In the heated process channel, the velocity of a boiling mixture increases as the steam voids increase, and at high steam qualities the velocity is several magnitudes higher than at lower quality. In pool boiling the velocity of the blanketing steam is essentially zero, and the principal heat transfer mechanisms at burnout are conduction through the vapor blanket plus radiation from the heater surface to the water surface. Under these conditions the temperature jump or transition jump will be severe, resulting in burnout or melting of the heater.

With the heat transfer greatly improved by convective heat transfer in a forced flow process channel, the transition temperature jump is less severe, and at high steam qualities where the vapor velocity is high, very good heat transfer coefficients are realized. Heat transfer coefficients of 700–1200 B.t.u./hr./ft.$^2$/° F. are common values for steam quantities of 30 to 80 percent. It has been found that after the transition point the heat transfer coefficient changes very little until near the dry saturated range where it begins to improve again.

Figure 2:
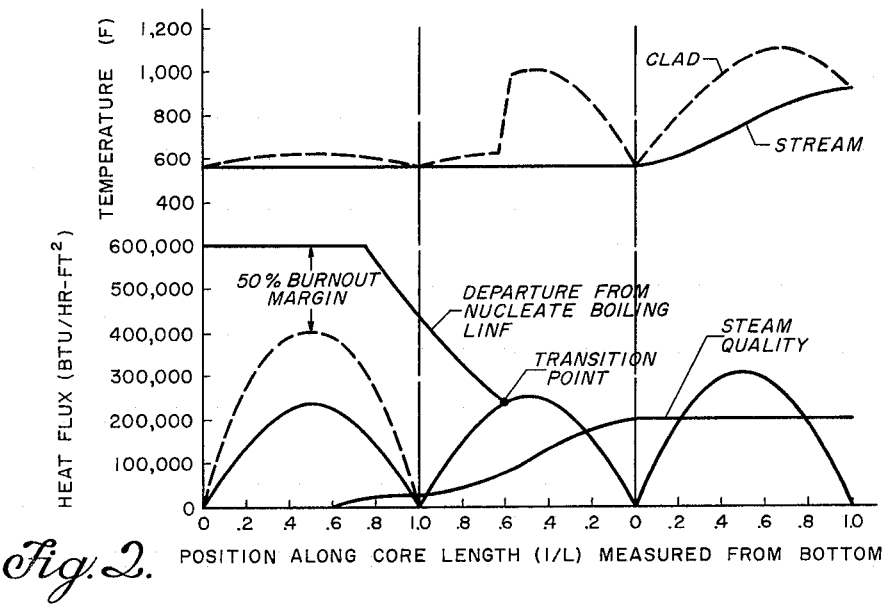
FIGURE 2 is a line drawing showing the relationship between heat flux and position along the core for a triple pass once-through superheat reactor.
Figure 1:
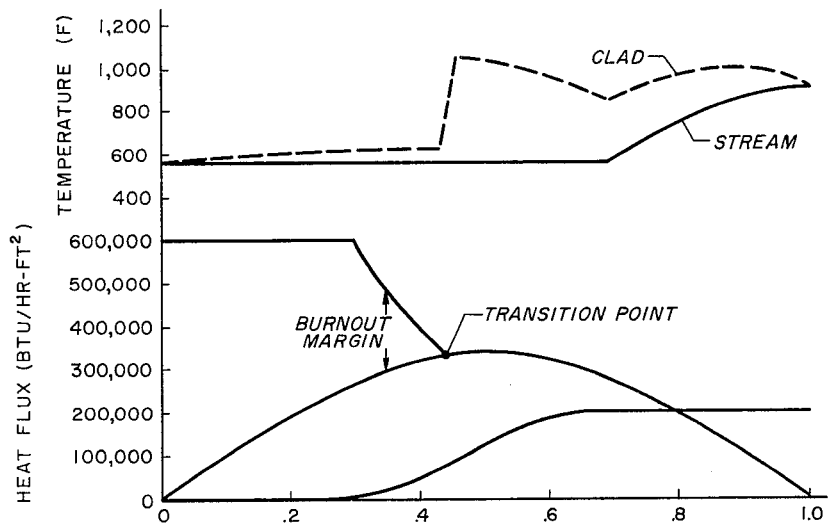
FIGURE 1 is a line drawing showing the relationship between heat flux and position along the core for a single pass once-through superheat reactor.
Figure 3:
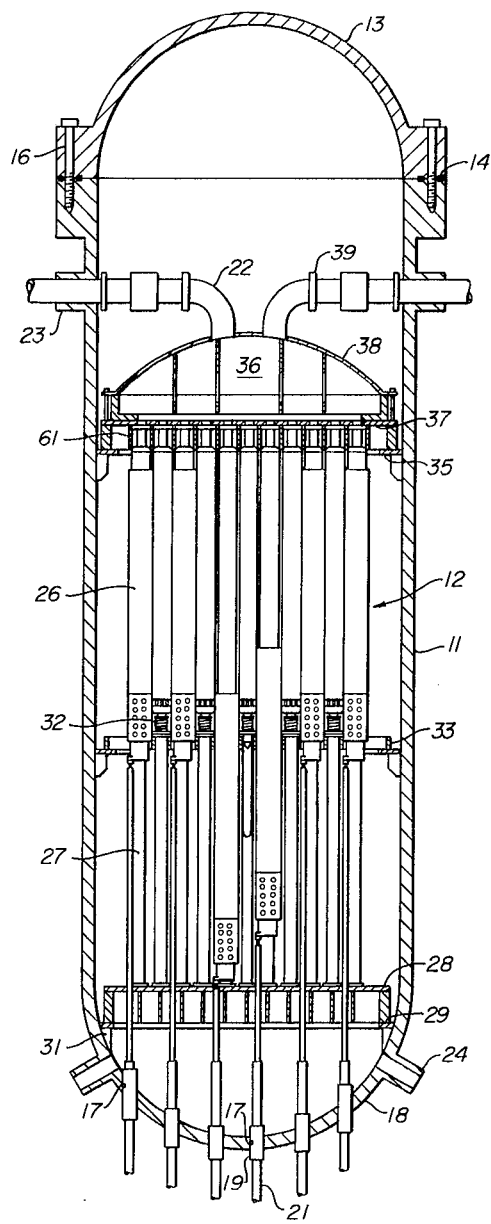
FIGURE 3 is a cross sectional side view of a neutronic reactor embodiment incorporating the fuel bundles and bundle supports of the invention.

FIGURE 1 illustrates the characteristics for a single pass once-through fuel element. For ease of calculation this study is based on a cosine heat flux variation with the associated change in quality from 0 to 100 percent. Corresponding to this quality variation is the usual burnout or "departure from nucleate boiling" limiting heat flux line. The single pass element must be designed with a low enough heat flux, such that the intersection between the actual hot channel heat flux line and the DNB line occurs at a quality about 30 percent. It should be noted that the safety factor for burnout at low qualities for these characteristics is unsafe. A local hot spot could cause burnout at low quality. A similar study for a two pass system shows an even poorer burnout safety margin. But the three pass system is ideal. This is illustrated in FIGURE 2. The first past is a conventional boiler pass exiting at an average exit quality of 10 percent. Applying the usual hot channel factors and burnout safety margin this pass becomes a conventional BWR design problem. The burnout safety margin improves at the end of the first pass and is quite high at the beginning of the second pass which will henceforth be referred to as the transition pass. By the time the actual transition point is reached the gap between the low quality "burnout" and high quality "transition" has been safely bridged. As far as burnout alone is concerned the three pass once-through reactor is as safe as or safer than an ordinary boiling water reactor. It may be safer because in the once-through reactor it is mandatory that the exit superheat temperature be closely controlled. This in turn sets a tight control on the exit steam quality from the boiler. Thus better monitoring of the boiling phase is provided.

The three pass system also provides a better length to diameter ratio for the core. It can be shown that with reasonable mass velocities, heat fluxes and coolant annulus sizes, the single pass once-through reactor must be made 20–30 feet long with a corresponding reduction in equivalent core diameter. Folded three times, the length and diameter become more reasonable as in the three-pass design.

A fuel bundle 81 having provisions for moisture extraction and demineralization between the second and third passes is shown in FIGS. 4–6. The bundle is made up of three types of fuel rods or process tubes enclosed within an outer shroud 82 having water inlet ports 80. Boiling rods 84 are interspersed in the interstices of an array of annular transition fuel elements 86 on the peripheries of the bundles together with superheat fuel elements 87 on the interiors of the bundles. Both transition and superheat elements comprise an outer process tube 88 and an inner fueled process tube 89 forming annular coolant flow passages 91.

Upper plenum base plate 92 holds boiling rods 84 by means of bores 93; while both the transition elements 86 and the superheat elements 87 are mounted communicapably through plate 92, the transition elements being capped by element 94 to prevent escape of steam from the transition pass directly into superheat plenum 96. Apertures 97 in the sides of the tops of transition tubes 86 control the pressure drop. Inner process tubes 89 of the transition elements 86 are further produced with swirl vanes 98, also being mounted through apertures 95 in plate 92, to centrifuge moisture to the heater surface. Vances 99 carried by transition tubes 88 further control the relative steam qualities entering tubes 88 and 89 of transition fuel elements 86.

The lower ends of rods 84 are mounted through grid 101 and the lower ends of transition and superheat process elements 86 and 87 are communicably mounted through lower base plate 102, fastened to necked down supporting cylinder 83. Centrally disposed baffle 103, octagonal in cross section, is fastened to the underside of base plate 102 and extends downwardly to provide transition and superheat zones 104 and 106, corresponding in location to axial extensions of transition and superheat elements 86 and 87. Steam separator plate 107 spirals downwardly between baffle 103 and shroud 82 to which it is rigidly attached to drain moisture to demister and centrifuge 108 (not shown) supported from the bottom portion of bundle 81. The demister 108 may be of conventional design, such as the wire mesh packing which is commercially available for gas demisting service.

The fuel bundle terminates below demister and centrifuge 108 and 109. Separable necked down portion 111 is joined with the core portion of bundle 82 at coupling 112, providing easy access to the stream separator 112, provided easy access to the steam separator 107, and the demister and centrifuge 108. Fuel support column and condensate downcomer 113, into which bundles 81 are slidably mounted, are held upright by supporting reactor bottom grid plate 114 (see FIGURE 6). Condensate rejected through the downcomers 113 enters condensate headers 116 (FIGURE 6) communicating through plate 114, and is withdrawn through line 117 to ion exchanger purification means (not shown) and/or recirculated through the reactor core.

In addition to reducing the fouling of the heater surfaces, the demineralizer system provides a manifold system at the bottom of the vessel interconnecting all of the fuel bundles. This equalizes the pressure across the reactor and increases the flow in the hottest superheat element. This further increases the allowable reactor power. Since the coolant enthalpy is leveled to dry saturated steam across the reactor at the entrance to the superheat pass, the sensitivity of the exit steam temperature to a power change is reduced considerably over that of a true once-through reactor.

Steam formed in superheat elements 87 exits through apertures 95 into superheat plenum 96 defined by superheat plenum grid plate 92 and housing 121 having flanged opening defined by tubular extension 122. Slotted tubular conduit 123 is slidably mounted over extension 122 and held from radial movement by brackets 124 fastened to extension 122 through slots therein (not shown), conduit rim 126 having O-ring seals 127 is held against grid 37 by compression spring 128 mounted between housing 121 and rim 126. Stainless steel bellows seal 129 prevents loss of steam through the slots in conduit 123 and between conduit 123 and the extension 122.

In the operation of a reactor incorporating fuel bundle 81 subcooled water enters the shroud 82 through openings 80 and fills the space between core rods and tubes. As the moderator contacts rods 84 it boils and exits toward the top with approximately 10 percent steam quality. Shroud 82 contains the boiling moderator and provides boiling water reactor-type void-reactivity characteristics. The wet steam passes through holes 97 in outer transition fuel element process tubes 88.

The wet steam mixture passes through both tube 89 and the annulus between tubes 89 and 88 of transition elements and exits into transition zone 104 at a steam quality somewhere between 70 and 80 percent. Moisture is centrifuged and demisted out of the coolant. The resulting dry steam is exited into superheat zone 106 and passes through both tube 89 and the annulus between tubes 88 and 89 of the superheat fuel elements 87 and finally exits into plenum 96 at the top of the bundle 81.

Reactor parameters for a 300 MW(e) plant based upon the foregoing design and disclosed in full in General Electric Report GEAP-3633, entitled "Economic Study for 300 MW(e) Once-Through Superheat Reactor," available from T.I.S. Department of Commerce, Washington 25, D.C., are as follows:

*Summary of once-through reactor data*

A. Thermal power _____ 833.0 MWT.
B. Steam conditions:
   1. Exit steam condition _ 980 p.s.i.a 900° F.
   2. Inlet condition _____ 1194 p.s.i.a. 400° F.
   3. Steam flow_____ 2,616,000 lbs./hr.

C. Reactor description:
1. Reactor vessel—
   a. Inside diameter -- 12.5 ft.
   b. Height _____ 49.50 ft.
   c. Wall thickness ___ 6.25 inches.
   d. Material _____ ¼" S.S. clad.
   e. Design pressure __ 1450 p.s.i.a.
   f. Design temperature _____ 650° F.
2. Reactor core—
   a. Active equivalent diameter _____ 9.00 ft.
   b. Active height ___ 11.5 ft.
   c. Active core loading _____ 732 ft.
   d. Total uranium loading _____ 42,700 kg.
   e. Overall average enrichment of core _____ 2.90 a. percent.
   Final enrichment _____ 1.31 a. percent.
   Plutonium at end of life __ 0.68 a. percent.
   f. Neutron moderator _____ Light water.
   g. Moderator to fuel ratio _____ 2.40.
3. Reflector—
   a. Material _____ Light water.
   b. Axial thickness __ 8 ft.
   c. Radial thickness on equivalent diameter _____ 13 inches.
4. Fuel elements—Boiler rods—
   a. Fuel material ___. $UO_2$.
   b. Fuel element geometry _____ Solid rod.
   c. Clad material ___. Zircaloy.
   d. Fuel "meat" diameter _____ 0.35 inch.
   e. Clad thickness ___ 0.026 inch.
   f. Fuel clad gap (cold) _____ None.
   g. Gap material ____ $H_e$.
5. Fuel elements—Transition-superheat—
   a. Fuel material ___. $UO_2$.
   b. Fuel element geometry:
      Annular I.D. __ 0.320".
      O.D. _____ 0.72".
   c. Clad material ___. 304 SS.
   d. Process tube material _____ Zircaloy.
   e. Process tube dimension:
      I.D. _____ 0.844".
      O.D. _____ 0.904".
   f. Lattice spacing ___ 1.264 inch.
   g. Shroud dimension 8.6" x 8.6" x .030".
   h. Shroud material _ Zircaloy.
7. Reactor Control—
   a. Method of control Control rod movement.
   b. Absorber material Boron steel.
   c. Number of control elements ___ 52.
   d. Cross sectional dimensions _____ 9.36" x 9.36".
   e. Effective length __ 11.5 ft.
   f. Type of drive ____ Hydraulic locking piston.

D. Performance Data:
1. Reactor coolant _____ Water and/or steam.
2. Reactor mass flow rates (lbs./hr.-ft.²)—
   a. Boiler pass:
      Ave. _____ .091×10⁶.
      Max. _____ .1135×10⁶.
   b. Transition pass:
      Ave. _____ .565×10⁶.
      Max. _____ .707×10⁶.
   c. Superheat pass:
      Ave. _____ 1.0×10⁶.
      Max. _____ 1.25×10⁶.
3. Reactor coolant outlet temperature _____ 900° F.
4. Steam pressure (p.s.i.a) _____ 980 exit.
5. Steam coolant flow ___ 2,616,000 lbs./hr.
6. Maximum fuel temp. (125% power) _____ 3800° F.
7. Maximum clad temperature (100% power) __ 1250° F.
8. Maximum heat flux (125% power)—
   a. Boiler pass _____ 400,000 B.t.u./hr.-ft.².
   b. Transition pass __ 432,000 B.t.u./hr.-ft.².
   c. Superheat pass ___ 540,000 B.t.u./hr.-ft.².
9. Average heat flux for reactor—
   a. Boiler pass _____ 117,200 B.t.u./hr.-ft.².
   b. Transition pass __ 120,000 B.t.u./hr.-ft.².
   c. Superheat pass __. 150,000 B.t.u./hr.-ft.².
10. Average core power density _____ 39.7 kw./liter.
11. Average specific power _____ 19.5 kw./kg.
12. Peak to average power ratios—
    a. Boiler:
       Axial _____ 1.60.
       Radial _____. 1.25.
       Hot spot factor 1.2.
       Peak to average cross channel _____ 1.13.
       Overpower ____ 1.25.
       Total _____. 3.40.
    b. Transition-superheat:
       Axial _____ 1.57.
       Radial _____. 1.25.
       Hot spot factor . 1.25.
       Peak to average cross channel _____. 1.22.
       Overpower ____ 1.25.
       Total _____. 3.60.
13. Average core flow velocities (ft./sec.)—
    a. Boiler pass:
       Inlet _____ .472.
       Exit _____. 1.70.
    b. Transition pass:
       Inlet _____ 10.6.
       Exit _____ 62.7.
    c. Superheat pass:
       Inlet _____ 111.0.
       Exit _____ 196.0.
14. Fuel management ___ 20% batch reloading.
15. Average fuel burnup 18,750 mwd./mtu.
16. Peak/average burnup ratio) _____ 1.87.

While the invention has been disclosed with respect to several preferred embodiments, it will be apparent to those skilled in the art that numerous variations and modifications may be made within the spirit and scope of the invention and thus it is not intended to limit the invention except as defined in the following claims.

What is claimed is:

1. In a bundle of fuel elements for a water boiler superheat reactor, the combination comprising:

a plurality of boiler rods interspersed between a plurality of process tubes, each carrying an inner concentric fuel tube;

means for supporting said rods and said tubes in parallel spaced alignment;

a shroud encasing said boiler rods and process tubes joined with said means for supporting same, said shroud having openings at one end for admission of reactor coolant;

a superheat plenum receiving the open ends of at least a portion of said tubes and adapted to receive superheated steam therefrom;

a plenum having an outlet therefrom;

a mixing plenum receiving the open ends of at least a portion of said process tubes and the distal ends thereof from the superheat plenum adapted to receive low quality wet steam therefrom;

superheat plenum outlet structure detachably joined with said superheat plenum and adapted for a compression fit with core plenum structure;

means for rigidly mounting said fuel bundle within a reactor core; and a compression spring radially encircling one end of said bundle with stops against said bundle structure and against structure on one end of said bundle adapted to yield under pressure.

2. The fuel bundle of claim 1 in which sized apertures in the upper portions of the process tubes are provided to facilitate pressure control.

3. In a bundle of fuel elements for a water boiler superheat reactor, the combination comprising:

a plurality of boiler rods interspersed between a plurality of process tubes each carrying an inner concentric fuel tube, said boiler rods terminating at the lower ends above the ends of the process tubes, said process tubes having sized openings at the top ends thereof to facilitate pressure regulation and steam distribution;

grid means at the lower ends of the boiler rods supporting said boiler rods and having openings therein for passage of moderator fluid;

upper superheat plenum structure having an upper outlet adapted to rigidly hold the upper ends of said boiler rods and process tubes and having openings in the lower portion thereof communicating with said inner concentric fuel tubes;

lower processing plenum structure adapted to rigidly support the lower ends of said process tubes, said upper plenum wall having openings communicating with said process tubes, said lower processing plenum containing means for separating moisture from wet steam; and means for removing same from said fuel bundle for purification.

4. The fuel bundle of claim 3 in which swirl vanes are carried by said process tubes furtherest from the longitudinal axis of the bundle in the annular spaces between said process tubes and said inner concentric fuel tubes.

5. In a bundle of fuel elements for a water boiler superheat reactor, the combination comprising:

a plurality of boiler rods interspersed between a plurality of process tubes each carrying an inner concentric fuel tube, said boiler rods terminating at the lower end of the bundle above the ends of the process tubes, said process tubes having means to regulate pressure and amount of steam admitted to the upper end thereof;

grid means at the lower ends of the boiler rods supporting said boiler rods and having openings therein for the passage of moderator fluid;

upper superheat plenum structure having upper outlet, said plenum structure being adapted to support said tubes without passage of low temperature moist steam into said superheat plenum from the bundle, said superheat plenum being further adapted to support said inner concentric fueled process tubes with openings for transmission of superheated steam from said inner concentric tubes to said superheat plenum;

a lower process plenum rigidly retaining the lower ends of said process tubes in matching openings therethrough;

a shroud enveloping said bundle and sealed against said upper and lower plenum structure, said shroud having openings for introduction of moderator fluid thereto;

a cylindrical support column slidably retaining the lower portion of said fuel bundle including stop means in combination therewith limiting the length of the slip fit, and adjustable compression holddown spring means encircling said superheat plenum outlet in combination with overlapping extension of said superheat outlet, said spring means being adapted to force said outlet extension upwardly away from said outlet; and means for forming a compression fit between said superheat steam plenum outlet and a reactor superheat steam receiving means.

References Cited by the Examiner

UNITED STATES PATENTS

| | | | |
|---|---|---|---|
| 3,049,487 | 8/1962 | Harres et al. | 176—54 |
| 3,121,666 | 2/1964 | Wheelock | 176—54 |
| 3,185,630 | 5/1965 | Ammon | 176—54 |

LEON D. ROSDOL, *Primary Examiner.*

MELVIN J. SCOLNICK, *Assistant Examiner.*